A. C. LINTZ.
GRAIN-TALLY, BAG-HOLDER AND WEIGHER.

No. 193,414. Patented July 24, 1877.

UNITED STATES PATENT OFFICE.

ADAM C. LINTZ, OF SWEET AIR, MARYLAND.

IMPROVEMENT IN GRAIN-TALLY, BAG-HOLDER, AND WEIGHER.

Specification forming part of Letters Patent No. 193,414, dated July 24, 1877; application filed April 30, 1877.

*To all whom it may concern:*

Figure 1:
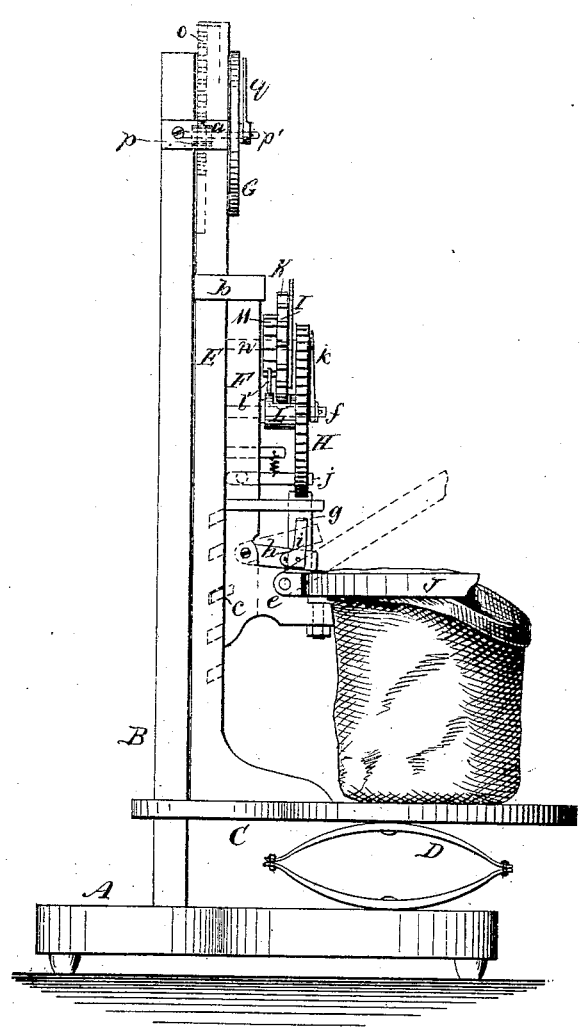
Figure 2:
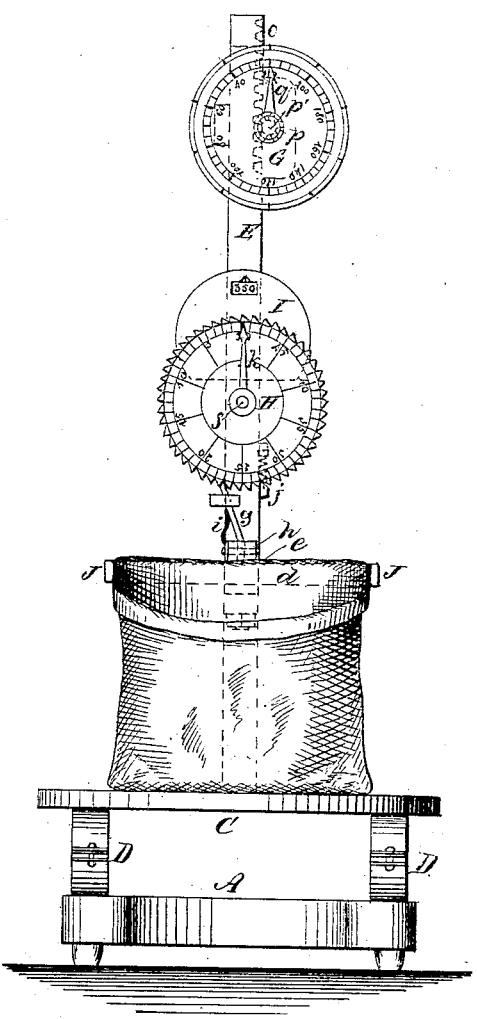
Figure 3:
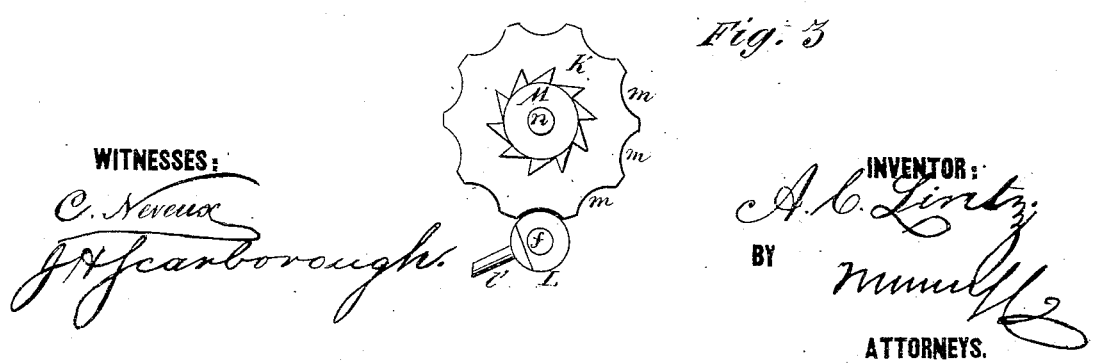

Be it known that I, ADAM C. LINTZ, of Sweet Air, in the county of Baltimore and State of Maryland, have invented a new and Improved Bag-Holder, Tallier, and Weigher, of which the following is a specification:

Figure 1 is a side elevation. Fig. 2 is a front elevation. Fig. 3 is a detail view of a portion of the registering mechanism.

Similar letters of reference indicate corresponding parts.

The invention will first be described in connection with the drawing, and then pointed out in the claims.

In the drawings, A is a base-piece, in which the standard B is fixed, and C is a movable platform, mounted on springs D, that are attached to the base-piece A.

The platform C is apertured to receive the standard B, and is further guided by the standard E, which is attached to the platform C, and passes through a guide, a, that is secured to the standard B.

The bag-support F is connected with the standard E by a clip, b, and by an inclined dowel or hook, c, that may be placed on either of a series of holes in the standard E.

A curved piece, d, is attached to the support F, for receiving the edge of the bag, and J is a curved piece that is hinged to the support F at e, and is arranged to clasp the bag between it and the piece d.

H is a ratchet-wheel, that turns on a stud, f, that projects from the support F, and g is a pawl that is jointed to a lever, h, that is hinged to the support F, and extends over the curved piece J, so that when the said piece is raised the lever h and pawl g will also be raised. A spring, i, is fastened to the lever h, and bears against the pawl g, and serves the double purpose of throwing the pawl into engagement with the ratchet-wheel H, and of throwing the pawl and lever down when the curved piece J is carried down to clasp a bag.

A spring-detent, J, is pivoted to the side of the support F, in position to engage with the teeth of the wheel H.

An index, k, is attached to the stud f, upon which the wheel H turns, and the face of the said wheel is graduated into as many divisions as there are notches in its periphery. A hub, L, is formed on the back of the wheel H, which is notched in one side, and provided with a finger, l'.

M is a ratchet-wheel, secured to the wheel K, having the arc-shaped notches m. These wheels are placed on a stud, n, that projects from the support F. The ratchet-wheel M is turned one tooth by the finger l' at every revolution, and when the wheel is so turned the periphery of the notched wheel K turns in the notch in the hub, and after it is turned one of the notches m is engaged by the cylindrical part of the hub L, preventing the further rotation of the wheel K until the wheel H has made another complete revolution.

The face of the wheel K is graduated and figured, and a disk, I, is attached to the stud n, and is apertured, so as to show but a single graduation of the wheel K.

The wheel H in the present case is provided with fifty teeth and the same number of graduations, and the wheel M has ten teeth and the wheel K the same number of graduations, so that every revolution of the wheel K indicates five hundred movements of the part J.

The upper end of the standard E is provided with a rack, o, and the pinion p on the spindle p' meshes into the rack. The spindle p is journaled in the guide a, and projects through the graduated dial G, and is provided with an index, q.

The operation of my improved apparatus is as follows: The support F is adjusted on the standard E to the proper height for the bags to be filled and weighed. A bag is then clasped between the curved pieces d and J. Grain is poured into the bag until the required weight is indicated by the index q. The curved piece J is then raised to release the bag, and at the same time the pawl is carried upward, moving the wheel H one notch. The wheel H makes a revolution for every fifty bags removed from the apparatus, and every revolution of the wheel H is registered by the wheel K.

My improvement is designed more particularly for the use of thrashers in measuring grain; but it may be employed for other purposes.

Having thus described my invention, I claim as new and desire to secure by Letters Patent—

1. The combination of the graduated ratchet-wheel H, having the notched hub L, the finger l', fixed index k, ratchet-wheel M, notched and graduated wheel K, lever h, pawl g, and the hinged piece J, substantially as herein shown and described.

2. The base-piece A, standard B, springs D, platform C, standard E, rack o, pinion p, index q, and dial G, in combination, substantially as shown and described.

3. The fixed curved piece d and hinged curved piece J, in combination with the adjustable support F and standard E, substantially as shown and described.

ADAM COLEP LINTZ.

Witnesses:
DAVID E. MICHAEL,
JOHN H. GILL.